(12) United States Patent
Lok et al.

(10) Patent No.: US 8,144,051 B2
(45) Date of Patent: Mar. 27, 2012

(54) ADAPTIVE SIDELOBE BLANKING FOR MOTION COMPENSATION

(75) Inventors: Yuchoi F. Lok, Framingham, MA (US); Kaichiang Chang, Northborough, MA (US); Jerome H. Pozgay, Marblehead, MA (US)

(73) Assignee: Raytheon Company, Waltham, MA (US)

( * ) Notice: Subject to any disclaimer, the term of this patent is extended or adjusted under 35 U.S.C. 154(b) by 847 days.

(21) Appl. No.: 12/231,802

(22) Filed: Sep. 5, 2008

(65) Prior Publication Data

US 2011/0309972 A1     Dec. 22, 2011

(51) Int. Cl.
*G01S 13/52* (2006.01)
*G01S 3/16* (2006.01)
*G01S 13/00* (2006.01)

(52) U.S. Cl. ............ 342/161; 342/73; 342/74; 342/81; 342/159; 342/160; 342/368; 342/377; 342/378; 342/379

(58) Field of Classification Search .............. 342/73–81, 342/159–162, 175, 195, 25 R–25 F, 89, 94, 342/194, 196, 368–377, 350, 385, 417, 421, 342/450, 451, 378–384; 343/700 R, 757
See application file for complete search history.

(56) References Cited

U.S. PATENT DOCUMENTS

| | | | | |
|---|---|---|---|---|
| 3,806,924 A | * | 4/1974 | Applebaum | 342/161 |
| 4,021,805 A | * | 5/1977 | Effinger et al. | 342/94 |
| 4,034,370 A | * | 7/1977 | Mims | 342/25 D |
| 4,084,158 A | * | 4/1978 | Slawsby | 342/25 F |
| 4,959,653 A | | 9/1990 | Ganz | |
| 5,053,772 A | * | 10/1991 | Lamper et al. | 342/25 A |
| 5,122,807 A | * | 6/1992 | Trask et al. | 342/420 |
| 5,166,689 A | | 11/1992 | Pankow et al. | |
| 5,200,754 A | * | 4/1993 | Niho | 342/25 D |
| 5,248,976 A | * | 9/1993 | Niho et al. | 342/25 A |
| 5,394,151 A | * | 2/1995 | Knaell et al. | 342/25 F |
| 5,488,373 A | * | 1/1996 | Hellsten | 342/25 D |
| 5,592,178 A | | 1/1997 | Chang et al. | |
| 5,708,436 A | * | 1/1998 | Loiz et al. | 342/25 A |

(Continued)

OTHER PUBLICATIONS

Farina, A. et al., "Calculation of Blanking Probability for the Sidelobe Blanking for Two Interference Statistical Models," IEEE Signal Processing Letters, 5, (4), (1988) 98-100.

(Continued)

*Primary Examiner* — Bernarr Gregory
(74) *Attorney, Agent, or Firm* — Christie, Parker & Hale, LLP

(57) ABSTRACT

A motion compensation method and system is included in a radar antenna system mounted on a moving platform which is subject to pitch, yaw and roll. The radar antenna system includes a main array antenna, and an auxiliary antenna. The auxiliary channel associated with the auxiliary antenna utilizes roll, pitch and yaw angle motion compensations as its auxiliary antenna always steers a horizontal fan shape beam at the horizon to blank any surface (land or sea) based EM interferences. Such motion compensations are provided by a ship motion compensator component and process included within the antenna system. The ship motion compensator component in response to platform motion signals indicative of changes in platform motion angles generates new sets of values using an initial set of weighting coefficient values as a function of such angle motion changes. This produces changes in both amplitude and phase weighting coefficient values which results in both the quadrant phase rotation and the element weighting rotation. The process steers and spreads out the received auxiliary antenna pattern making sidelobe coverage broad enough to compensate for such changes in platform motion.

31 Claims, 10 Drawing Sheets

U.S. PATENT DOCUMENTS

| | | | |
|---|---|---|---|
| 5,777,573 A * | 7/1998 | Klausing et al. ............. | 342/25 F |
| 5,874,917 A | 2/1999 | Desodt et al. | |
| 5,986,605 A | 11/1999 | Priebe et al. | |
| 6,037,893 A * | 3/2000 | Lipman ........................ | 342/25 F |
| 6,100,844 A | 8/2000 | Whiting et al. | |
| 6,320,541 B1 | 11/2001 | Pozgay et al. | |
| 6,369,746 B1 | 4/2002 | Green et al. | |
| 6,377,212 B1 | 4/2002 | Kinghorn et al. | |
| 6,384,782 B2 | 5/2002 | Erikmats et al. | |
| 6,538,597 B1 | 3/2003 | Steudel | |
| 6,618,008 B1 | 9/2003 | Scholz | |
| 6,633,253 B2 * | 10/2003 | Cataldo ....................... | 342/25 R |
| 6,677,886 B1 | 1/2004 | Lok | |
| 6,697,010 B1 * | 2/2004 | Lam ........................... | 342/25 R |
| 6,768,444 B2 | 7/2004 | Langsford | |
| 6,828,929 B2 | 12/2004 | Barbella et al. | |
| 7,109,911 B1 * | 9/2006 | Cataldo ....................... | 342/25 R |
| 7,145,496 B2 * | 12/2006 | Cho et al. .................... | 342/25 R |
| 7,145,498 B2 * | 12/2006 | Cho et al. .................... | 342/25 R |
| 7,167,884 B2 | 1/2007 | Picciolo et al. | |
| 7,181,054 B2 | 2/2007 | Zaleski | |
| 7,277,042 B1 * | 10/2007 | Cho et al. .................... | 342/25 F |
| 7,339,540 B2 * | 3/2008 | Tietjen ......................... | 343/757 |
| 7,701,379 B2 * | 4/2010 | Niktash ........................ | 342/159 |
| 7,916,085 B2 * | 3/2011 | Kimball ........................ | 342/451 |
| 7,978,124 B2 * | 7/2011 | Cook et al. .................... | 342/160 |
| 2006/0181451 A1 | 8/2006 | Samson, Jr. | |
| 2007/0080855 A1 | 4/2007 | Gerlach et al. | |

OTHER PUBLICATIONS

Farina, A. et al., "Design of SLB systems in the presence of correlated ground clutter," IEEE Proc.-Radar, Sonar Navig., 147 (4) (2000) 199-207.

Farina, A. et al., "Interference Blanking Probabilities for SLB in Correlated Gaussian Clutter Plus Noise," IEEE Transactions on Signal Processing, 48 (5) (2000) 1481-1485.

Farina, A. et al., "Systolic Schemes for Joint SLB, SLC, and Adaptive Phased-Array," Alenia Marconi Systems published in the 2000 IEEE International Radar Conference.

Lohrmann, Dieter R., "Coordinate Transformation for Phased Array Antenna Beam Steering Using GPS and Ship's Motion Data," Naval Research Laboratory Report No. NRL/MR/5740-00/8485, Sep. 18, 2000.

Rudge, A.W. et al., "The Handbook of Antenna Design", IEEE Electromagnetic Wave Series, published by Peter Peregrinus Ltd., London UK, Copyright 1982-1983, 737-749.

* cited by examiner

ADAPTIVE SIDELOBE BLANKING FOR MOTION COMPENSATION

The United States Government has rights to this invention pursuant to Contract No. N00024-04-C-5340 awarded by Department of the Defense.

BACKGROUND OF THE INVENTION

1. Field of the Invention

This invention relates generally to antenna system design and more particularly to sidelobe blanking for use in radar motion compensation systems.

2. Description of Related Art

A Sidelobe Blanking (SLB) system is commonly used for mitigating interference in radar and telecommunications systems. As known in the art, the SLB system operates to compare the signal outputs of one or more low directivity auxiliary antennas to the output signal of the main antenna of the radar antenna system. When the signal level received in an auxiliary channel of an auxiliary antenna is equal to or greater than signal level in the main channel of the main antenna, the SLB system discards the main channel response as interference.

In certain applications, the SLB system is designed to provide near horizon coverage in a forward hemisphere for a limited scan phased array radar system. A phased array antenna system when mounted on a moving vehicle such as a ship may undergo significant three dimensional angular displacements relative to the horizon even in reasonably quiet seas, such as "roll", "pitch" and "yaw". Roll corresponds to the side-to-side angular motion about a longitudinal, i.e. fore and aft, axis of the vehicle. Pitch corresponds to the alternating motion about an axis perpendicular to the longitudinal axis of the vehicle. Yaw corresponds to the change in the azimuth direction about a vertical axis.

To compensate the effect of vehicle or ship motion, several approaches have been used. The mechanical rotation or servomechanism is commonly used in reflector antenna systems. Electronic beam steering of the main antenna beam is commonly used in phased array antenna systems. For the purpose of this discussion, electronic beam steering is defined as the ability to electronically steer the beam maximum of an antenna electric field pattern to some predefined point in space. Such electronic beam steering is performed on the main beam by altering the antenna electric field pattern during its transmission.

The combination of servomechanism and electronic beam steering is also used in many systems for economical and practical reasons. Most of the servomechanism motion compensation systems compensate for movement in two axes only—azimuth and elevation. It is because the radar beam shape used is a pencil beam shape. If a vertical fan beam is used, such as in the maritime surveillance radar SPS-49, the target altitude is unimportant and thus there is no need for motion compensation.

In the application of SLB against surface based (land or sea) interferences, a horizontal fan beam is used in the auxiliary antenna associated with the main antenna. When the platform of such SLB system moves, maintaining the roll angle of this horizontal fan beam is vital for the effectiveness of the SLB system. Such roll angle compensation is not known to exist in any radar system. One reason is that the use of a mechanical approach is difficult due to the mounting axle being inline with the radar beam. The alternative approach is electronic beam steering however; the number of antenna elements for the auxiliary antenna is usually very small. Hence, the capability of rotating such antenna pattern is very limited.

SUMMARY OF THE INVENTION

Accordingly, it is therefore an object of the present invention to provide a method and system for providing motion compensation which does not have the disadvantages of the prior art.

It is another object of the present invention to provide a method and system of motion compensation in conjunction with sidelobe blanking and is adaptive to dynamically changing motion environments.

The above and other objects are achieved according to an illustrated embodiment of the compensation method and system of the present invention which is included in a radar antenna system mounted on a moving platform making it subject to pitch, roll and yaw. The present invention utilizes an electronic method for steering, extending or increasing the coverage of an auxiliary antenna by spreading the horizontal fan beam pattern for providing the required amount of motion compensation for effective sidelobe blanking.

In greater detail, the radar antenna system of an illustrated embodiment of the present invention includes a main array antenna, and an auxiliary antenna, having a small number of elements for sidelobe blanking. The auxiliary antenna couples to an auxiliary channel. When the auxiliary antenna scans with the main antenna beam for providing constant main antenna sidelobe coverage, the associated auxiliary channel does not require motion compensation such is the case in the prior art discussed above. As in the case of the illustrated embodiment, when the auxiliary antenna is positioned to always steer near the horizon to blank any land based EM interferences, it's associated auxiliary channel requires motion compensation.

In the illustrated embodiment, such motion compensation is provided by a ship motion compensator component and process included, for example, within a radar data processor component which operatively couples to an auxiliary beam steering generator (BSG) used to provide phase and attenuation data signals to the auxiliary antenna array element components. The radar data processor receives current platform motion signals from an Inertial Measurement Unit (IMU) and current platform location information from, a Global Positioning System (GPS). A beam pointing processor component included in the radar processor component calculates values specifying the next radar beam pointing direction to be applied to the auxiliary and main BSG components in a conventional manner.

In an illustrated embodiment, a memory associated with the ship motion compensator component is used for storing an initial set of weighting coefficient values which define or establish the characteristics of the auxiliary antenna beam pattern. These compensation values are applied to the auxiliary beam steering generator component resulting in the generation of a desirable auxiliary beam antenna pattern to be utilized by the antenna system during a receive cycle of operation.

In accordance with the teachings of the present invention, during antenna system operation, the ship motion compensator component in response to platform motion signals indicative of changes in platform pitch, yaw and roll angles generates a new set of weighting coefficient values from the initial set of weighting coefficient values provided by the memory as a function of such pitch, yaw and roll angles change. The changes in both amplitude and phase weighting coefficient values result in both the quadrant phase rotation and the element weighting rotation. Such rotations compensate for changes in roll angle by spreading out the auxiliary antenna pattern received from the auxiliary antenna making sidelobe coverage broad enough to cover a tilted horizon frame of reference in terms of elevation angle and an extended region in azimuth. The compensation for pitch and yaw angles is achieved by simply changing the quadrant phase values either before or following roll compensation changes. This causes the received auxiliary beam to be electronically steered toward the horizon.

During a receive cycle of operation, the compensated auxiliary antenna pattern generated by the auxiliary beam steering generator is applied to the sidelobe blanking circuits for blanking out interference in an effective manner notwithstanding changes in antenna platform motion. The initial amplitude and phase weighting coefficient factors values utilized by the illustrated embodiment of the present invention can also be generated in a predetermined manner off-line in accordance with the teachings of the present invention. For example, after generating different sets of weighting coefficient values to be used to compensate for various changes in platform pitch, yaw and roll angles, such values are stored in a memory. During operation, these patterns can be then selected using the various pitch, yaw and roll angles derived from the current platform motion data signals received from an Inertial Measurement Unit (IMU).

Additional objects, features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and which includes the following.

FIGS. 4C through 4F illustrate several examples of coefficient amplitude values and phase coefficient values generated as a function of roll angle according to the teachings of the present invention.

DESCRIPTION OF ILLUSTRATIVE EMBODIMENT

Figure 1A:
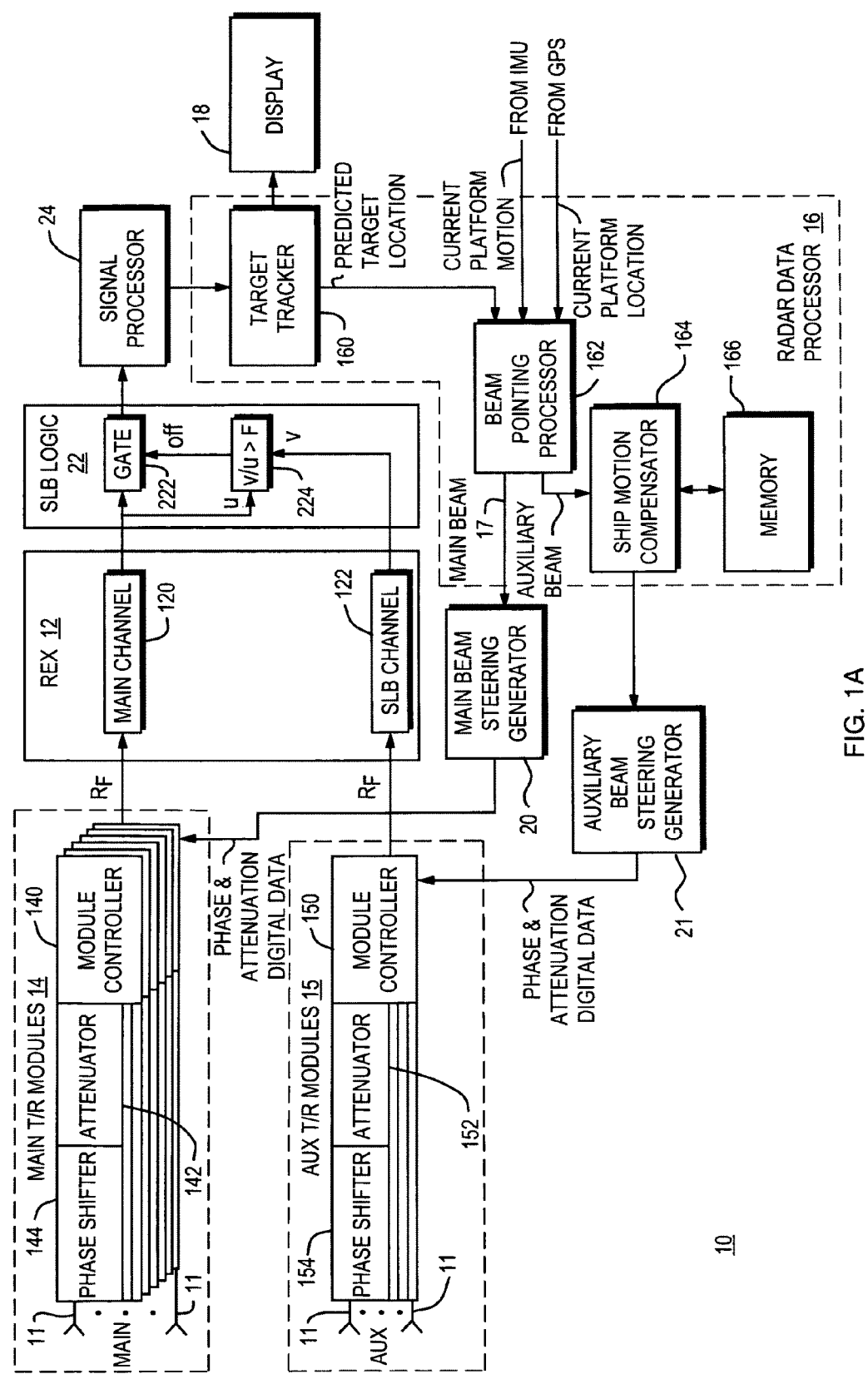
FIG. 1A is a block diagram of the illustrated embodiment which incorporates the ship motion compensator method and system of the present invention.

Referring to FIG. 1A, there is shown an illustrative embodiment of the present invention which comprises a moving platform phased array radar system 10 incorporating the motion compensation method and system of the present invention. In the illustrated embodiment, the motion compensation system is utilized for carrying out effective sidelobe blanking for a shipboard moving platform based antenna system. Obviously, the motion compensation system may also be used for other types of moving platform antenna systems without departing from the teachings of the present invention. As shown in FIG. 1A, system 10 includes a plurality of conventional components that can be found in a phased array radar system. These components include a receiver/exciter (REX) component 12 that includes main and SLB auxiliary antenna channels 120 and 122 respectively which couple to a plurality of main and auxiliary transmit/receive (T/R) modules 14 and 15 respectively, a radar data processor 16 coupled to a display unit 18 and a main beam steering generator 20 arranged as shown. The system 10 also includes a sidelobe blanking (SLB) logic circuit 22 which couples between the REX component 12 and a signal processor component 24. As discussed herein, the SLB logic circuit 22 for the purposes of the present invention can also be considered conventional in design.

The components of FIG. 1A will now be described in greater detail. Each of the main and auxiliary antenna channels 120 and 122 receive radar antenna input signals from the main and auxiliary antenna radiating elements 11 respectively of a phased array antenna system (not shown). As well known in the art, the phased array antenna system is implemented with a large number of antenna radiating elements which are individually excited. As indicated in FIG. 1A, each antenna radiating element is fed by transmit/receive (T/R) module included in the main and auxiliary T/R modules 14 and 15. As shown, each main T/R module includes phase shifter 144, attenuator 142 and module controller 140 circuits. Similarly, each auxiliary T/R module includes phase shifter 154, attenuator 152 and module controller 150 circuits. As discussed herein, according to the teachings of the present invention, these circuits of the auxiliary T/R module 15 are used to control the shape characteristics of the incoming SLB auxiliary beam pattern received from the auxiliary antenna radiating elements 11.

During the transmit mode, the radar data processor 16 supplies beam pointing direction signals 17 to the main beam steering generator 20. During transmit, beam steering is provided by the main beam steering generator 20 which is carried out by the main antenna only in a conventional manner. The T/R modules 14, 15 delay the excitation of selected radiating elements. For this type of antenna, adequate delays can be supplied by adjusting the phase of the excitation signals applied by the antenna T/R modules 14, 15 to the radiating elements 11; hence the term "phased array antennas" is used. The T/R module phase shifters 144, 154 are used for controlling the phase, and the attenuators 142, 152 (e.g. digitally controlled) are used for controlling the amplitude. The module controllers 140, 150 operate to establish the different modes of operation for the respective T/R modules and provide such digital control. More specifically, as discussed herein, phase and attenuation digital data signals are applied to the module controllers 140, 150 which in turn apply weighting coefficient value control signals to the respective phase shifter circuits 144, 154 and attenuator circuits 142, 152.

During each receive cycle of operation, the RF outputs of the main and auxiliary T/R modules 140, 150 are applied to the REX component 12 main and auxiliary channels 120 and 122 whose outputs are fed to SLB logic circuit 22. The output of SLB logic circuit 22 is applied to signal processor 24 which couples to the radar data processor 16. In the illustrated embodiment, the main and auxiliary SLB channels 120 and 122 are implemented with the same components.

The auxiliary antenna of the antenna system is omni directional and has gains higher than most of the main antenna sidelobes. It is designed to provide a very broad beam pattern so that it can cover all of the sidelobes of the main antenna as discussed herein with reference to FIGS. 2A-2C. Sidelobe blanking arrangements are discussed in the article entitled "Systolic Schemes for Joint SLB, SLC, and Adaptive Phased-Array" by A. Farina, L. Timmoneri Alema Marconi Systems published in the 2000 IEEE International Radar Conference. It is well known in the art that the number and arrangement of antenna elements may be selected to suit the requirements of the system and that the number dictates the number of lobes which are generated and the width of the main beam.

Still referring to FIG. 1A, as described in the above referenced Farina article, the SLB logic circuit 22, conventional in design, controls a switch gate circuit 222. The SLB logic circuit 22 receives output sidelobe pattern signals "v" from the auxiliary antenna channel 122 and the main beam sidelobe output pattern signals "u" in addition to a blanking threshold F value that is a system design parameter. The SLB logic circuit 22 further includes a comparator circuit 224 which compares the sidelobe output pattern signals v to u. Only those output signals of the main channel 120 are passed through the gate circuit 222 to signal processor 24 which the comparator circuit 224 determines are stronger than the output sidelobe signals of the SLB auxiliary channel by an amount of equal to the blanking threshold F value in dB.

In a conventional manner, the signal processor 24 in response to signals received from the SLB logic circuit 22 provides output signals indicative of target detections. That is, the signal processor 24 includes target detector circuitry (not shown) for detecting targets. It provides target detection data to radar data processor 16 for further processing as discussed herein.

Broadly, the radar data processor 24 can be viewed as a multitask computer capable of concurrently executing a plurality of processes which will be discussed in greater detail in connection with FIG. 1B. As shown in FIG. 1A, radar data processor 16 includes a target tracker component 160, a beam pointing processor component 162, and a ship motion compensator component 164 with associated memory 166. The target tracker component 160 receives target detection data from signal processor 24 and provides track up date information to track files which are made available to a radar system operator via display unit 18. It also generates predicted target location information from processing recorded history of target tracking data stored in the track files maintained by the radar data processor 16 component. For the purpose of the present invention, these operations used in providing target prediction location data can be assumed to be carried out in a conventional manner.

Also as shown in FIG. 1A, the radar data processor 16 receives current platform motion signals from an Inertial Measurement Unit (IMU) and current platform location information from a Global Positioning System (GPS). These signals are applied as inputs to the beam pointing processor component 162 along with the predicted target location signals received from target tracker component 160. For the purposes of the illustrated embodiment, the IMU and GPS units may be considered conventional in design and operate to generate the required platform motion and location information signals in a well known manner and therefore, will only be discussed to the extent necessary herein. For further information see Naval Research Laboratory Report No. NRL/MR/5740-00-8485 by Dieter R. Lohrmann, dated Sep. 18, 2000, titled "Coordinate Transformation for Phased Array Antenna Beam Steering Using GPS and Ship's Motion Data" describes the use of GPS data, conversion of geocentric data and required coordinate transformations for a phased array antenna.

The beam pointing processor 162 of radar data processor 16 produces beam pointing direction signals applied as inputs to the main beam and auxiliary beam steering generator components 20 and 21 for establishing the beam pointing direction of the main and auxiliary beams. It will be noted that the auxiliary beam under discussion is the one which is associated or scanned along with the main beam (e.g. included as part of the same antenna). In fact, the functions of these components may be combined into a single component which operates in a conventional manner to generate signals for steering the main and auxiliary beams in the right direction. The pointing direction signals could take the form of beam steering commands which cause the main beam and auxiliary beam steering generator components 20 and 21 to provide time delay commands to the subarrays, phase shifter and attenuation circuits of the T/R modules for proper positioning of the main and auxiliary radar beams during target tracking operations. For the purpose of the present invention, these operations can be considered to be carried out in a conventional manner.

As described herein, the radar data processor beam pointing processor 162 component also provides appropriate weighting factor sets via Auxiliary Beam Steering Generator 21 component for forming or establishing the characteristics of the radar main and auxiliary antenna beam patterns being transmitted by the main and auxiliary T/R modules 14, 15 during transmit cycles of operation. The weighting factor sets are generated in a conventional manner to compensate for the failed elements/sub-array or platform motion. The process of computing weighting coefficients is described in section 9.1.2 of the text entitled "The Handbook of Antenna Design", by A. W. Rudge, K. Milne, A. D. Oliver and P. Knight, IEE Electromagnetic Wave Series, published by Peter Peregrinus Ltd., London UK, Copyright 1982-1983.

In accordance with the teachings of the present invention, and as described in greater detail herein with reference to the illustrated embodiment, the radar data processor component 16 further includes a ship motion compensator component 164 which contains hardware and software for producing compensation amplitude and phase rotation weighting coefficient values according to the teachings of the present invention. These values are applied to auxiliary beam steering generator component 21 during receive cycles of operation of the radar antenna system to be applied in manner which compensates for changes in ship platform roll, pitch and yaw angles motion indicated by the IMU and GPS input signals received during radar antenna system operation.

Figure 1B:
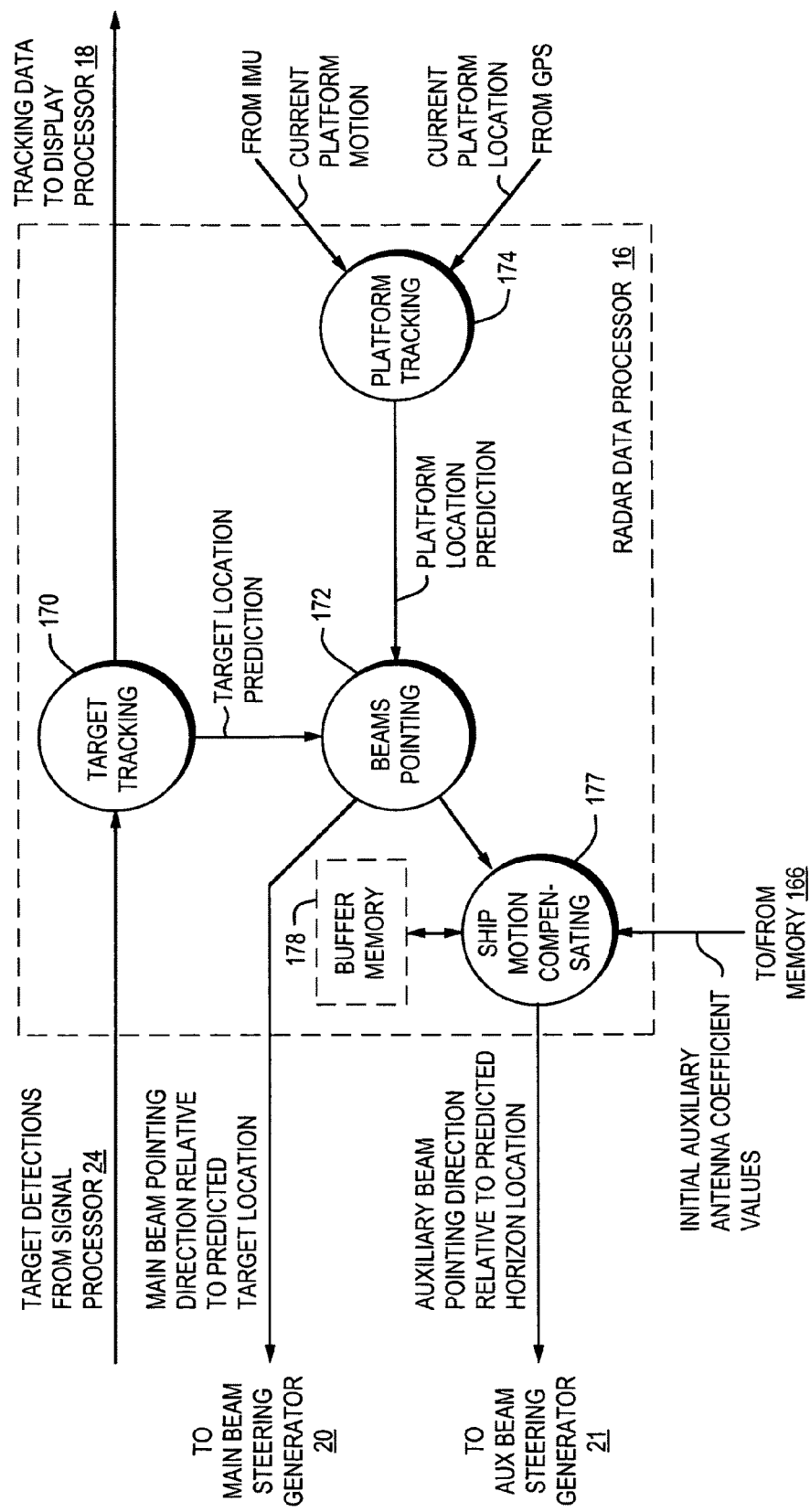
FIG. 1B illustrates in greater detail, the functions carried out by the radar data processor component of FIG. 1A.

Referring to FIG. 1B, FIG. 1B illustrates the different processes performed by the radar data processor component 16. As discussed above, the radar data processor component 16 performs a number of different tasks or functions including target tracking, beams pointing, platform tracking, and ship motion compensating. The circles in FIG. 1B are used to denote these specific processes labeled 170, 172, 174 and 177 and the lines/arrows are used to represent signal/data transfers taking place between the processes. It will be appreciated that there can be multiple threads of processes being executed by the radar data processor component 16 of FIG. 1A. In addition to the processes 170 through 177, radar processor 16 further includes a buffer memory 178 shown in dotted lines which is used by the process 177 in performing the operations/functions of amplitude rotation and phase rotation as described herein.

As shown in FIG. 1B, signal processor 24 component applies target detection signals to the target tracking process 170. This process provides target track update information in the form of tracking data which are made available to display 18 for operator viewing. Additionally, as discussed above, target tracking process 170 generates target location prediction signals indicating the paths of detected targets processed from the stored track files using standard algorithms. The prediction signals are applied to the beam pointing process 172 which also receives platform location prediction signals from platform tracking process 174. The process 174 generates platform location prediction signals based on current platform information signals received from the IMU component which include ship roll, pitch and yaw data. The current platform location signals include standard longitude and latitude co-ordinate positioning information. For the purpose of the present invention, these operations can be considered to be performed in a conventional manner.

The beams pointing process 172 computes the antenna beam pointing angles including roll, pitch and yaw angle values for the auxiliary antenna according to the received ship platform motion signals. Also, the beams pointing process 172 in response to target location prediction signals and current platform location information generates main beam pointing direction signals in a conventional manner which are in turn applied to the main beam steering generator 20 component.

Additionally, the beams pointing process 172 in accordance with the teachings of the present invention, provides roll, pitch and yaw angle values in a form which can be applied as inputs to the ship motion compensating process 177. As indicated in FIG. 1B, the process 177 also receives a set of initial or default antenna weighting coefficient values from memory 166 which can be preloaded during radar system calibration or initialization operations. As described herein, based upon the received roll, pitch and yaw angles and initial weighting coefficient values applied from memory 166, the ship motion compensating process 177 is able to generate new amplitude and phase coefficient values which produce both quadrant phase rotation and amplitude array element weighting rotation compensating for changes in platform motion. The process 177 uses a buffer memory 178 to generate the resulting new amplitude and phase coefficient values generated from the initial values applied by memory 166 and stores the results in the buffer memory 178. As discussed herein, the contents of buffer memory 178 are applied as inputs to auxiliary beam steering generator 21 during a receive cycle of operation.

Figure 2A:
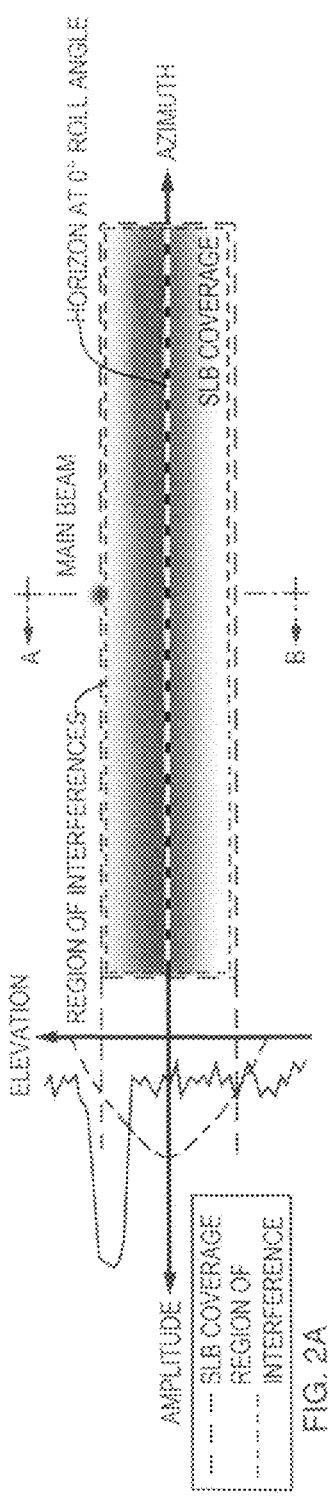
FIGS. 2A through 2C illustrate examples of sidelobe blanking coverage by an auxiliary antenna beam pattern for the cases of no platform motion, no motion compensation and motion compensated sidelobe blanking and the results of applying the teachings of the present invention.
Figure 2B:
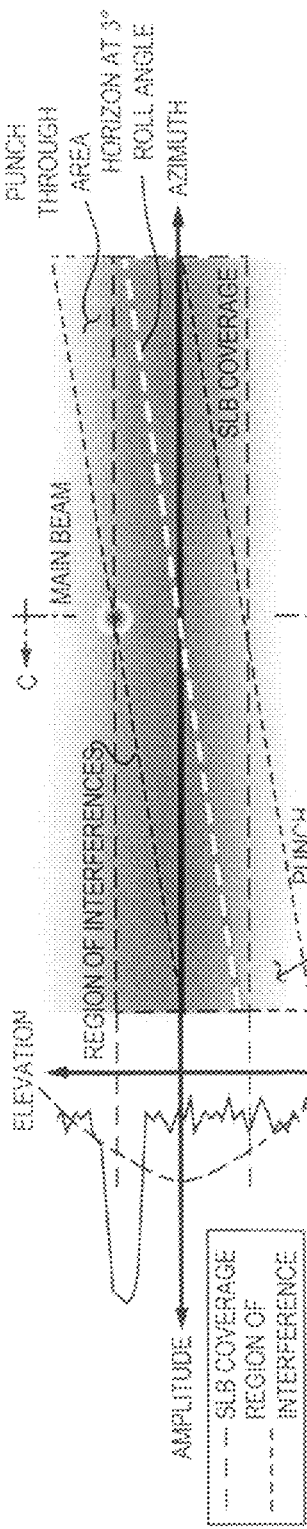
Figure 2C:
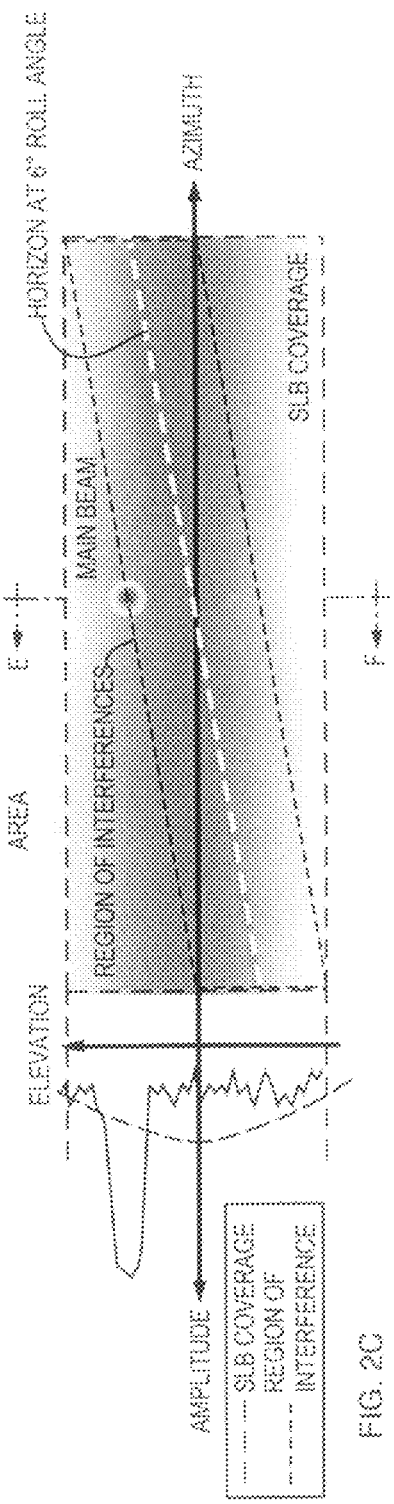

Referring to FIGS. 2A through 2C, FIGS. 2A through 2C are used to illustrate the benefits of the teachings of the present invention in providing effective sidelobe blanking through roll angle compensation. The figures illustrate sidelobe blanking coverage provided by an auxiliary antenna in three situations which include:

(1) the case of no platform motion, (2) the case of platform motion with no motion compensation and (3) the case of platform motion with motion compensation. In the drawing figures, the waveforms on the left side represent the main beam and auxiliary beam antenna patterns which correspond to cross sections taken at center points A-B of the waveforms on the right side. The main beam pattern corresponds to the high amplitude narrow pulse shown in as a solid line and the auxiliary beam pattern corresponds to the broad low amplitude pulse shown in broken lines. In the waveforms on the right side in FIGS. 2A through 2C, the dotted lines are used to represent the region of interference and the dashed lines are used to represent the SLB coverage being provided. The region of interference denotes interference at the horizon caused by land based sources such as radio stations, TV towers etc.

Referring to FIG. 2A, in FIG. 2A, with the horizon at a roll angle of zero degrees, it is seen that the SLB auxiliary antenna beam coverage is so small that at the two extremes (i.e. the upper and lower elevation angles), there is no coverage at all as indicated by the dotted horizontal lines. Therefore, any change in platform orientation would render the SLB coverage ineffective against such interference sources. In FIG. 2B, with a small change in horizon such as a six degree roll angle change, it is seen that the sidelobes of the main antenna beam are breaking through (i.e. punch through areas above and below the dashed lines) the auxiliary antenna beam pattern. Thus, the SLB coverage is not effective in blanking out such interference sources which would likely result in the false detection of targets in the sidelobe area. Thus, the use of sidelobe blanking would not be effective for radar systems mounted on moving platforms.

Referring to FIG. 2C, FIG. 2C illustrates that with roll motion compensation, it is possible to provide effective SLB coverage for moving platform systems. More specifically, FIG. 2C shows with the same roll angle change of six degrees that a system with roll motion compensation, an auxiliary SLB antenna pattern can be spread out to provide broader SLB coverage. Thus, with such compensation, the only punch through is by the main antenna beam as illustrated in FIG. 2C. Thus, SLB coverage can be made to be effective notwithstanding changes in antenna platform roll angle motion.

Figure 3:
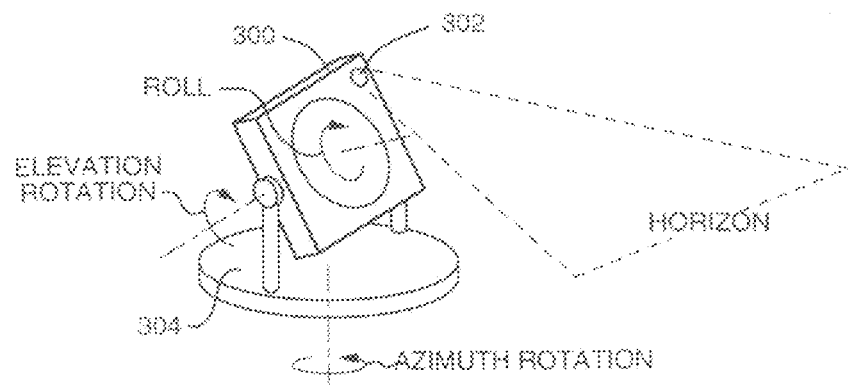
FIG. 3 illustrates the three axes of mechanical rotation for describing the application of the teachings of the present invention.

Referring to FIG. 3, FIG. 3 illustrates the different axes of mechanical rotation of a shipboard antenna platform that can occur during radar system operation for which motion compensation should be provided. As shown, the axes include elevation rotation, azimuth rotation and roll angle rotation along the indicated axes. FIG. 3 also depicts graphically, the roll angle type of compensation that is provided by the method and system of the present invention. As previously discussed in the background portion of the specification, azimuth and elevation rotation compensation have been typically achieved through the use of servomechanisms. However, it is recognized that this approach becomes impractical when roll angle compensation is attempted to be added because of mechanical complexities, size and weight of servomechanisms and the inability to attach or incorporate such servomechanisms into an existing antenna framework without redesigning the antenna system. As a result, by employing the method and system of the present invention, it now becomes possible to achieve such compensation without having to change the mechanical compensating systems being utilized in such radar antenna systems.

From FIG. 3, it is seen that the radar antenna system includes a main antenna represented by the block 300 and an auxiliary antenna represented by the circle 302 located in the upper right corner of the main antenna which are mounted on a moving platform 304. The plane of the main antenna is tilted slightly as indicated by the word "horizon" which is used to represent the broad beam coverage along the horizon provided by auxiliary antenna beam pattern. While the auxiliary antenna is shown in the upper position, it can also be placed in a lower position. It will be appreciated that in the case where the main antenna includes more than one (e.g. two) auxiliary antennas to provide SLB coverage, the auxiliary antennas will be positioned at different locations (e.g. at different heights) so as not to interfere with each other (i.e. so as to avoid multipath signal occurrences).

Figure 4A:
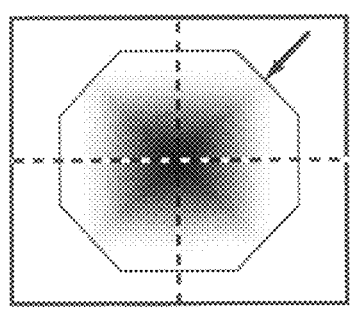
FIG. 4A graphically illustrates coefficient amplitude values before and after rotation generated according to the teachings of the present invention.
Figure 4A:
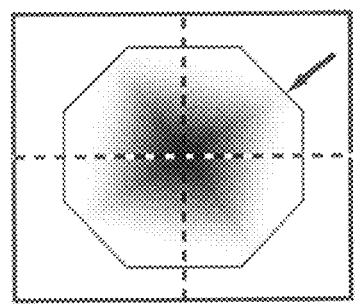
Figure 4B:
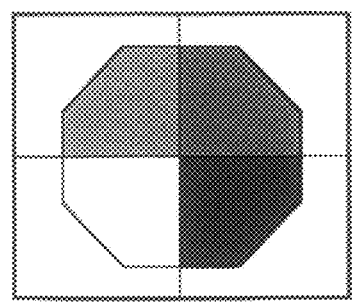
FIG. 4B graphically illustrates phase coefficient values before and after rotation generated according to the teachings of the present invention.
Figure 4B:
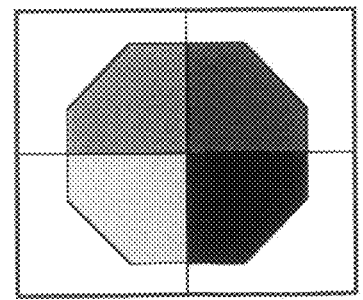

Referring to FIGS. 4A and 4B, FIGS. 4A and 4B are used to graphically illustrate the changes in amplitude values and phase values as a function of roll angle generated by the method and system of the present invention. The octagon shaped elements in FIG. 4A is divided into quadrants to better illustrate the change in coefficient amplitude values before and after rotation as a function of roll angle. FIG. 4A illustrates the shifting of amplitude values to adjacent antenna array elements in the direction of roll angle relative to a 45 degree angle as indicated by the slight increase in the amount of white space shown.

FIG. 4B illustrates different phase values in four quadrants and changes in such phase angle value in each quadrant by an amount proportional to the amount or value of roll angle. In each quadrant, the phase angle value magnitude is represented by the level of color intensity (e.g. the black colored quadrant has a higher value than the gray colored quadrant). Because the changes in roll angle illustrated are small, the changes in both amplitude and phase are also small.

As discussed herein, FIGS. 4C through 4F numerically illustrate changes in amplitude and phase values generated as a function of roll angle by the ship motion compensating process 177 of FIG. 1B. The operations performed by the process 177 are illustrated in the flow charts of FIGS. 5 and 6. These operations are implemented by Excel macro subroutines shown in an enclosed Appendix. The operations of the ship motion compensating process 177 in providing amplitude rotation will now be described with reference to FIG. 5.

Figure 4C:
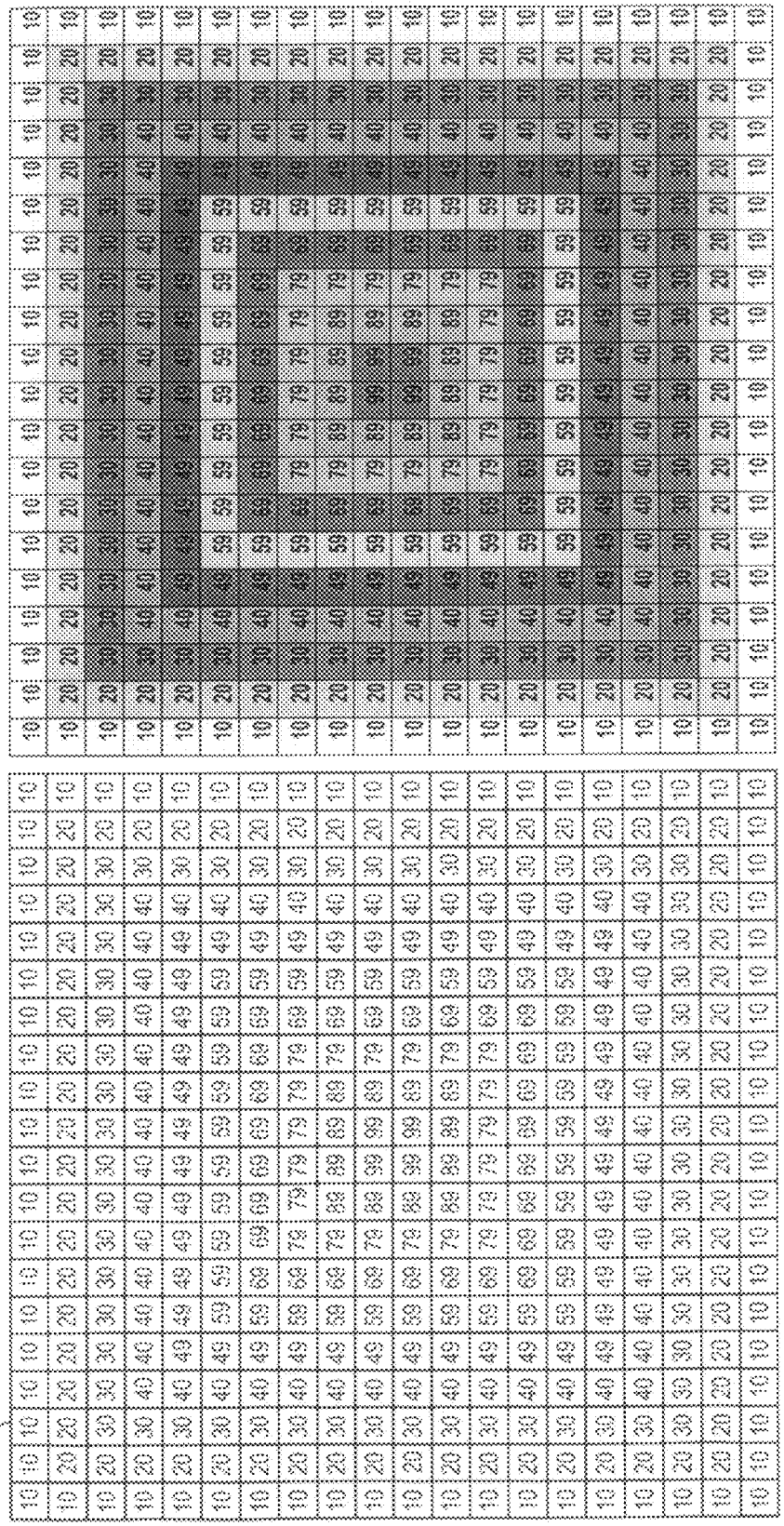
Figure 4D:
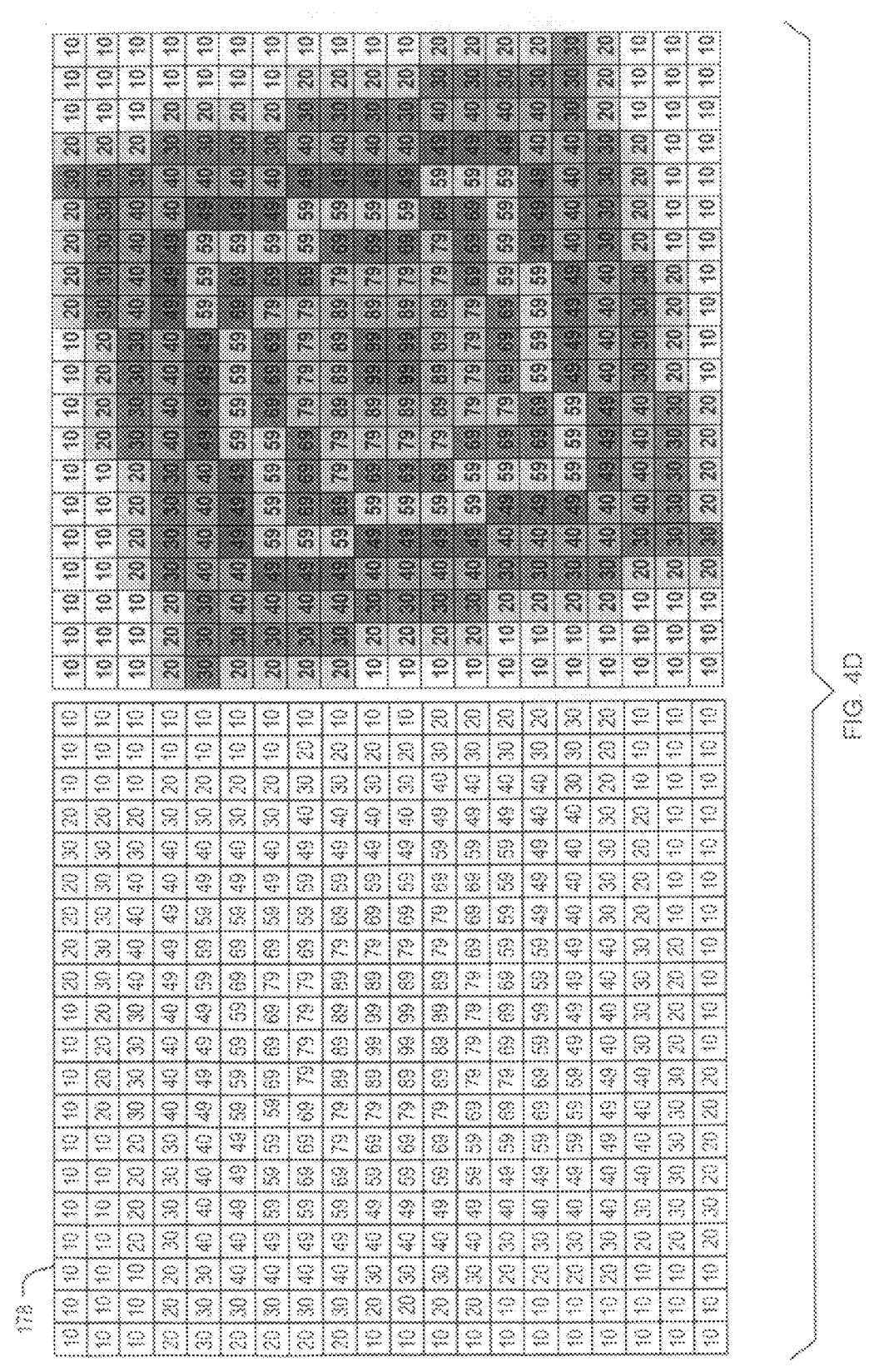
Figure 5:
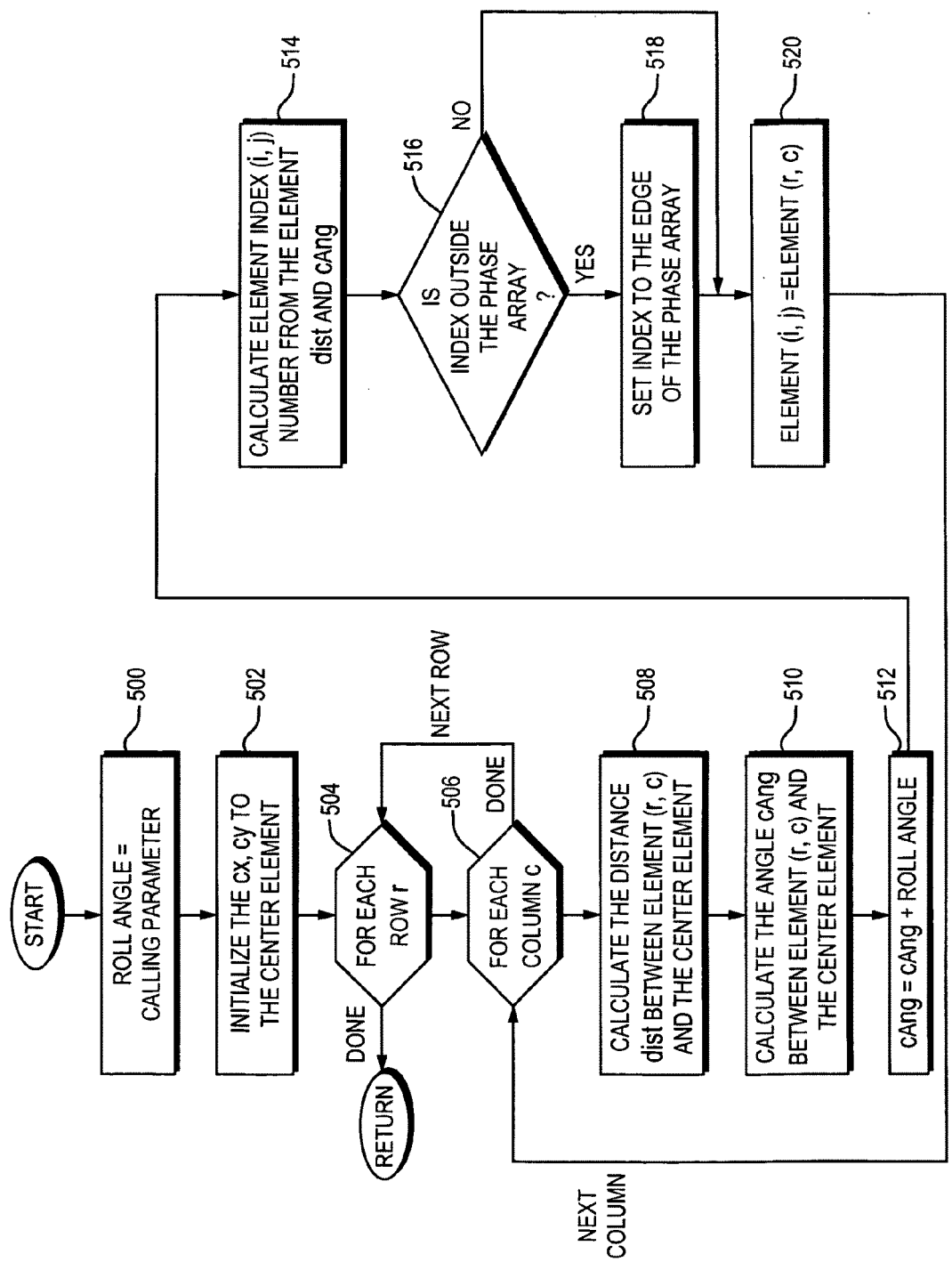
FIG. 5 is a flow chart used in describing the process for generating amplitude coefficient values for accomplishing amplitude rotation according to the teachings of the present invention.

Referring to FIG. 5, the ship motion compensating process 177 performs the function of amplitude rotation which starts with its setting the Roll Angle value to a calling parameter as indicated in block 500. This Roll Angle value corresponds to the center of the auxiliary antenna, which is designated (marked) by the initialized values of variables cx and cy as indicated in block 502. The process 177 then goes or sequences through each antenna element by row and column numbers as indicated in blocks 504 and 506. As discussed herein, the row and column numbers are represented in FIGS. 4C and 4D in the Excel spreadsheet representations of memory 166 and buffer memory 178 which are used to store the element values designated by such row and column numbers. The drawings at the right side of these figures represent the resulting amplitude patterns.

Process 177 then calculates the distance dist and angle cAng between the antenna element and the center of the antenna as indicated in block 508. Since the distance between antenna elements is fixed, the cAng and dist can be calculated using the element row and column numbers as indicated in block 510. As indicated in block 512, the Roll Angle is added to the cAng to become the new angular location. The distance of the new location is the same as dist because the center of rotation has not changed. As indicated in block 514, the new location is then calculated from dist and the new cAng. The coordinates of the new location are rounded off to become row and column number (i, j). If any one of the values of (i, j) is outside the antenna element row and column boundaries, the value will be truncated to the row and column numbers of the edge elements located at the boundaries as indicated in blocks 516 and 518. Before the roll angle value is applied, the amplitude value for the element at the row and column (r, c) is copied to the element at the new location (i, j) as indicated in block 520. It will be noted that the amplitude value of the element at (r, c) is stored in the Ship Motion Compensator Memory 166 of FIG. 1A as an initial value and will not be modified during radar system operation. The amplitude value copied to element (i, j) is in placed in buffer memory 178 utilized by the ship motion compensating process 177 and is sent to the Auxiliary Beam Steering Generator 21 component as described herein.

FIG. 4C illustrates examples of generated amplitude coefficient values stored in memory 166. More specifically, FIG. 4C corresponds to an Excel spread sheet representation labeled Amp which has been generated by the Excel rotate amplitude subroutine illustrated in the Appendix. The spreadsheet representation illustrates the set of initial amplitude coefficients before rotation. As discussed above, it is these unmodified or initial coefficient values that are stored in the ship motion compensator memory 166. The waveform pattern on the right side illustrates the resulting amplitude pattern.

FIG. 4D illustrates examples of generated amplitude coefficient values stored in buffer memory 178 after rotation. More specifically, FIG. 4D corresponds to an Excel spreadsheet representation labeled "rAmp" which has been generated by the Excel rotate subroutine in response to a roll angle of fifteen degrees. Again, the waveform pattern on the right side illustrates the resulting amplitude pattern. A comparison of the two waveform patterns in FIGS. 4C and 4D illustrate the changes in amplitude resulting from the 15 degree change in roll angle. The modified (rotated) amplitude coefficient values are stored in the buffer memory 178 and then sent to the Auxiliary Beam Steering Generator 21 component as discussed above.

Figure 6:
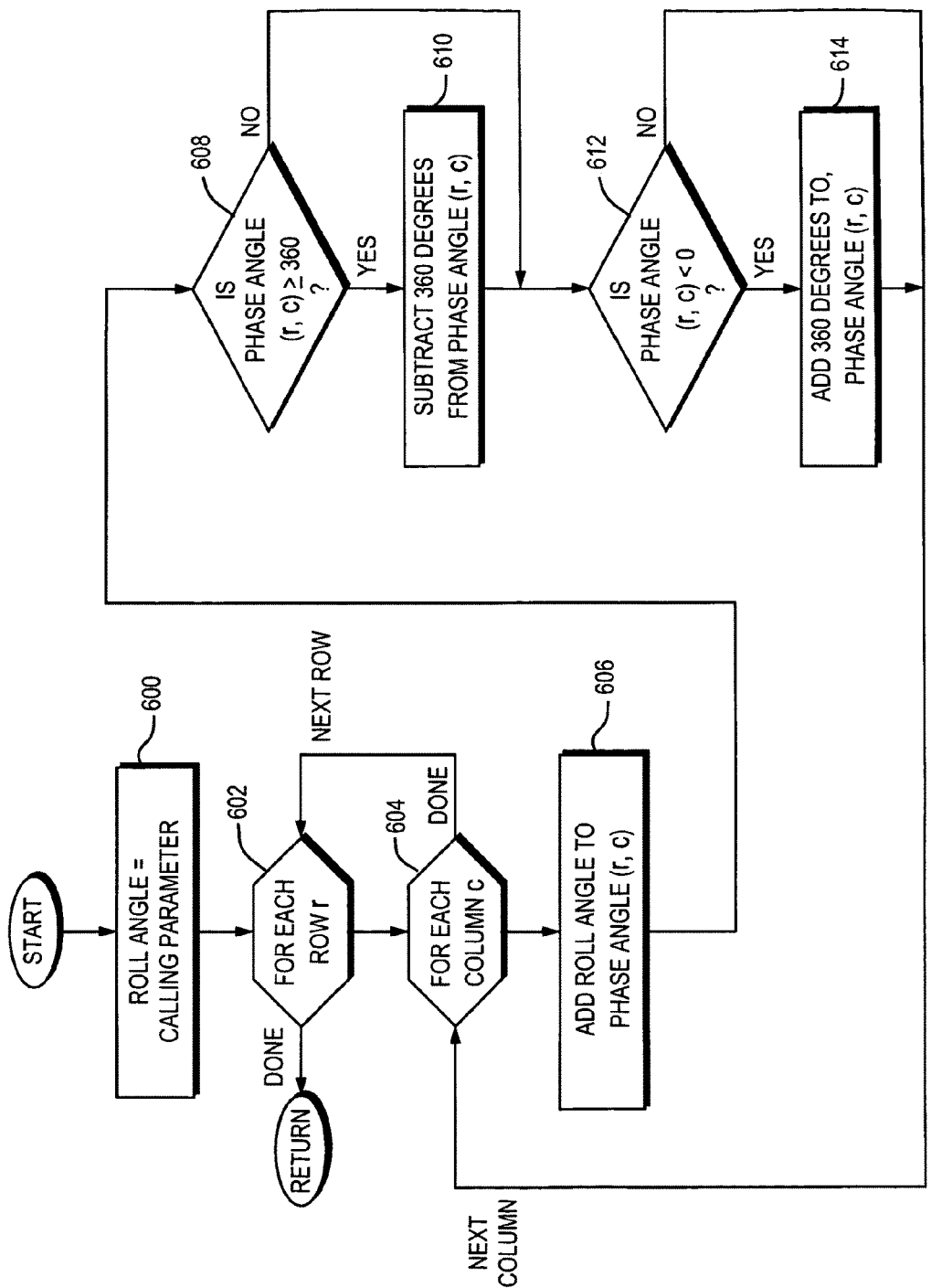
FIG. 6 is a flow chart used in describing the process for generating phase coefficient values for accomplishing phase rotation according to the teachings of the present invention.

The operations of the ship motion compensator process 177 in providing phase quadrant rotation will now be described with reference to the flow chart of FIG. 6 and to the spreadsheet representations of memory 166 and buffer memory 178 described above shown in FIGS. 4E and 4F. Referring to FIG. 6, the ship motion compensating process 177 performs the function of phase rotation which starts with setting the Roll Angle to a calling parameter as indicated in block 600. This Roll Angle is assumed to be measured in degrees. The process 177 sequences or goes through each antenna element by row and column numbers as indicated in blocks 602 and 604. As indicated in block 606, it adds the Roll Angle to the phase angle to form the new phase angle. If the new phase angle is outside the boundaries of 0 to 360 degrees, it is wrapped around by adding or subtracting 360 degrees as indicated in blocks 608 through 614. The new phase angle values are sent to the Auxiliary Beam Steering Generator 21 component. Again, the initial phase values are stored in the Ship Motion Compensator Memory 166 and will not be modified during radar system operation.

Figure 4E:
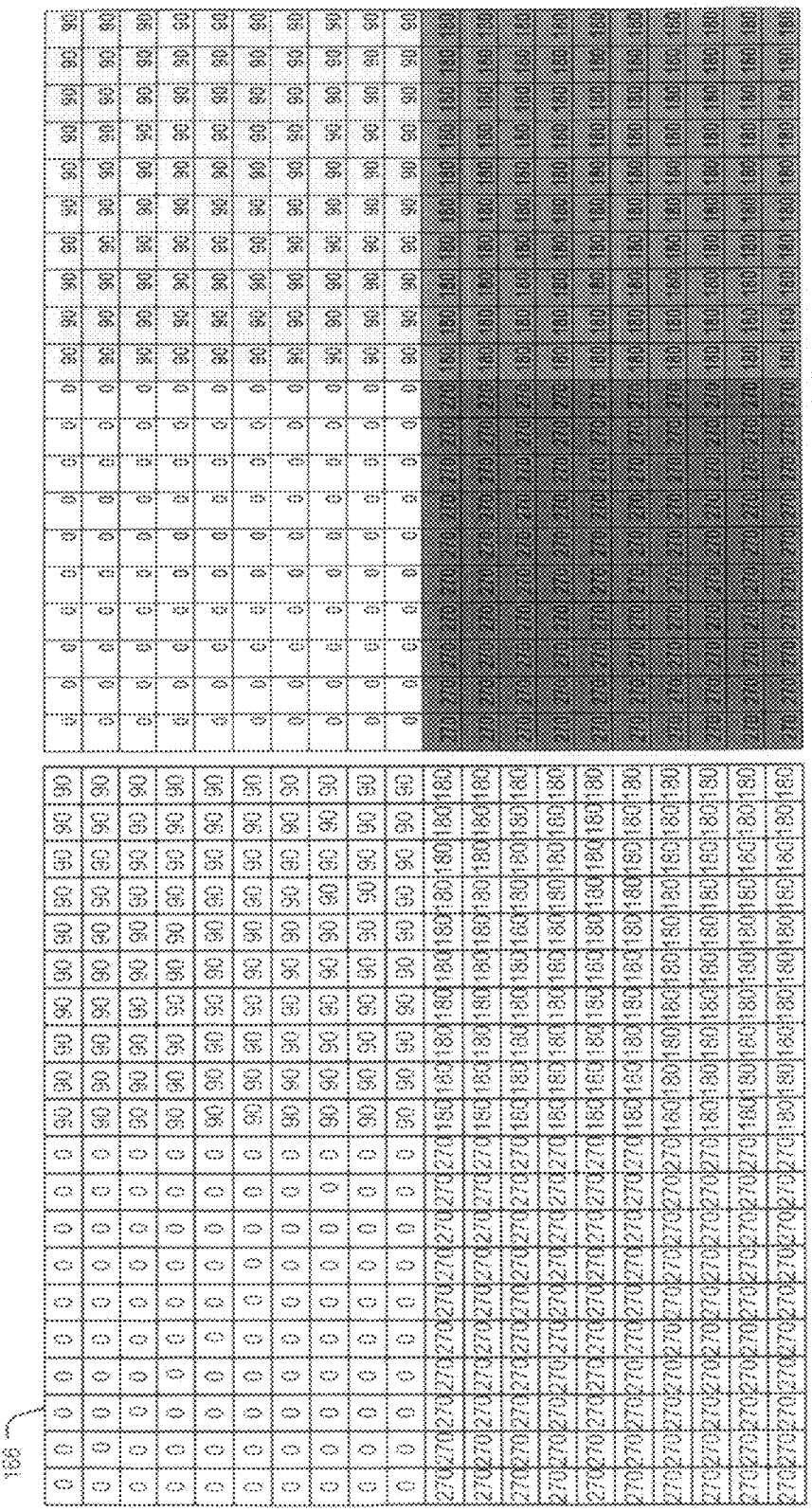

FIG. 4E illustrates examples of generated phase coefficient values after rotation stored in buffer memory 178. More specifically, FIG. 4E corresponds to an Excel spread sheet representation labeled Phs which has been generated by the Excel shift phase subroutine illustrated in the Appendix. The spreadsheet representation of memory 166 illustrates the set of phase angle coefficient values in four quadrants before rotation. It is these unmodified or initial phase angle coefficient values that are stored in the ship motion compensator memory 166 in conjunction with the initial amplitude coefficient values and remain unchanged during radar system operation.

Figure 4F:
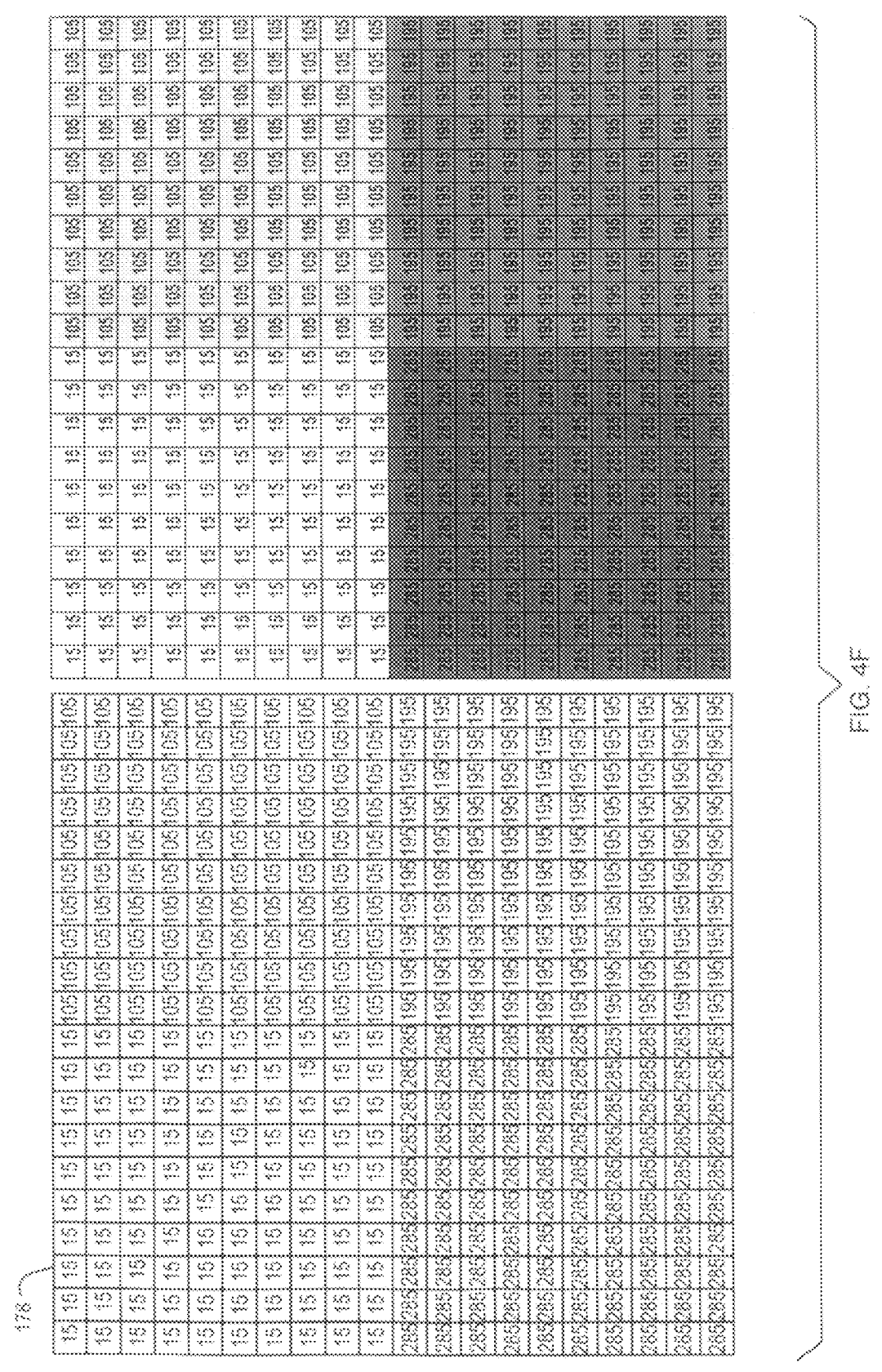

FIG. 4F illustrates examples of generated phase coefficient values after rotation. More specifically, FIG. 4F corresponds to an Excel spreadsheet representation of buffer memory 178 labeled "rPhs" which has been generated by the Excel shift subroutine in response to a roll angle of fifteen degrees. As indicated, these modified (rotated) phase coefficient values will be stored in the buffer memory 178 and sent to the Auxiliary Beam Steering Generator 21 component as discussed above. The waveform pattern on the right side of FIG. 4E illustrates the resulting rotated phase pattern. A comparison of the two waveform patterns in FIGS. 4E and 4F illustrate the changes in phase resulting from the 15 degree change in roll angle.

In addition to the roll angle compensation, the pitch and yaw angles are compensated by further changing the phase coefficient values in accordance with equation (1) as shown below.

$$rPHs'(r, c) = rPHs(r, c) + \frac{2\pi}{\lambda}(X(r) \cdot \cos\theta \cdot \sin\varphi + Y(c) \cdot (\sin\theta \cdot \cos\tau - \cos\theta \cdot \cos\varphi \cdot \sin\tau))$$ (Equation 1)

where
rPhs is the phase angle before or after roll compensation
rPhs' is the phase angle after roll, pitch and yaw angle compensations
r is the row number of the antenna element
c is the column number of the antenna element
X(r) is the vertical distance from the center of the array to the elements in row r
Y(c) is the horizontal distance from the center to the elements in column c
$\lambda$ is the wave length
$\theta$ is the pitch angle
$\varphi$ is the yaw angle
$\tau$ is the antenna tilt angle.

It will be appreciated that the additional compensation to phase as a function of changes in pitch and yaw angles can be carried out either before or after the compensator process 177 carries out the operations set forth in the flow chart of FIG. 6. It is only necessary that the phase compensation changes be carried out in cumulative manner so that the total effect of such changes can be properly realized.

Overall System Operation

To better appreciate how the method and system of the present invention provides efficient roll angle motion compensation, the operation of the system of FIG. 1A will now be briefly described. As discussed above, the ship motion compensator memory 166 will be initialized to store an initial set containing both amplitude coefficient weighting values and phase angle quadrant coefficient weighting values before rotation. The auxiliary antenna pattern is synthesized for beam shaping. Conventional techniques are used for carrying out such pattern synthesis and are discussed in the above referenced text entitled "The Handbook of Antenna Design". As discussed above, these synthesized values remain the same throughout radar system operation and define the characteristics of the auxiliary antenna beam SLB pattern (i.e. the dashed waveform in FIG. 2A).

During operation of the radar system, in response to platform motion information, such as roll, pitch and yaw angle values, received from the IMU, the beam pointing process 172 determines by performing comparisons of roll angle values over successive time intervals how much the auxiliary SLB antenna beam pattern is to be electronically rotated in terms of amplitude and phase for providing the required amount of roll, pitch and yaw angle compensation. These roll, pitch and yaw angle values are applied to the ship motion compensating process 177 which operates to generate the correct amplitude and phase rotation coefficients in accordance with the flow charts of FIGS. 5 and 6 and Equation 1.

The resulting new sets of weighting coefficient values are generated by compensating process 177 modifying the initial/default values stored in memory 166 as a function of roll, pitch and yaw angles and then applied to the auxiliary beam steering generator 21 component prior to the start of a receive cycle of operation. That is, compensating process 177 shifts the initial/default amplitude values to adjacent array element locations in the direction of roll, pitch and yaw angles and changes the phase angle in each quadrant by an amount proportional to the roll, pitch and yaw angles. It will be noted that the weighting coefficient values generated by the motion compensating process 177 are only used during receive operations. Therefore, the process 177 will predict the direction of ship motion based on the history of ship motion changes taking place. During operation, the rotated values such as those illustrated in FIGS. 4D and 4F stored in buffer memory 178 are in effect read out as a digital bit stream and applied to the auxiliary beam steering generator 21 as indicated in FIG. 1A.

It will be appreciated that ship motion speed (i.e. the rate of change in ship motion) is much slower than the computational speed of radar data processor 16 component. Therefore, when process 177 generates new sets of weighting coefficient values for roll, pitch and yaw angles of five degrees, two degrees, there may be some angle changes that are so small (e.g. .001 degrees) that no changes from the initial coefficient values are required to be made. Thus, process 177 can be set to change the initial/default values only after a preestablished amount of roll angle (e.g. every two antenna beam widths) which has been determined to be sufficient for providing efficient SLB coverage. These criteria can be established by the beam pointing process 172 or internally within the process 177. Thus, when the any one of the roll, pitch and yaw angles is determined to be greater than two antenna beam widths, the process 177 operates to generate new sets of amplitude and phase coefficient weighting values.

Thus, during system operation, process 177 may only generate new coefficient values every half second because ship motion changes slowly and the auxiliary antenna beam pattern is broad enough to provide effective sidelobe blanking. It will be appreciated that the process 177 can be easily adjusted to provide greater effective sidelobe blanking coverage as a function of roll, pitch and yaw angles over a period of time. Accordingly, the rotated values such as those illustrated in FIGS. 4D and 4F stored in buffer memory 178 will be only read out periodically and applied to the auxiliary beam steering generator 21.

This invention has been disclosed in terms of an illustrated embodiment. However, it will be apparent that many modifications can be made to the disclosed process and apparatus without departing from the invention. For example, the functions performed for amplitude and phase rotation could be implemented using well known hardware components such as programmable logic arrays etc. Further, these functions as a matter of design choice could be implemented as part of the auxiliary beam steering generator or the beam pointing processor components. Also, while the functions performed for amplitude and phase rotation were described as being carried out successively, it is obvious that such functions could be carried out in parallel with the results being stored in different areas of memory. Similarly, the results generated by such functions could also be applied in parallel to the beam steering generator and to the T/R circuits. Other arrangements will be obvious to those skilled in the art.

It will also appreciated that the compensation process and apparatus of the present invention can be used in conjunction with one or more auxiliary channels. Also, in certain situations, the roll compensation of the present invention may be used singularly or in combination with the above described forms of electronic steering compensation in addition to other compensation methods for maximizing the effectiveness of sidelobe blanking operations.

It will also be appreciated that while the illustrated embodiment describes a ship mounted moving platform phased array antenna system, the teachings of the present invention could also be utilized in other types of moving platform systems which are subject to platform angle motion. Therefore, it is the intent of the appended claims to cover all such variations and modifications as come within the true spirit and scope of this invention.

beam, auxiliary beam and side lobe antenna patterns from transmit/receive modules of the main and auxiliary antennas, the main and auxiliary channels being coupled to a sidelobe blanking (SLB) circuit for blanking out interference and whose output couples to a radar data processor included in the system to provide for accurate target detection, the method comprising:

(a) generating new sets of amplitude and phase digital coefficient values by a roll motion compensator modified as a function of roll angle information derived from platform motion data signals provided by the antenna system, each new set providing both the quadrant phase rotation and amplitude element weighting rotation;

(b) applying the new sets of amplitude and phase digital coefficient values generated by the roll motion compensator to an auxiliary beam steering generator; and (c) during a receive cycle of operation, the auxiliary beam steering generator applying each new set of amplitude and phase weighting coefficient values to the transmit/receive module of the auxiliary antenna for causing both amplitude and phase rotation of the received auxiliary beam SLB antenna pattern resulting in a pattern broad enough to provide effective sidelobe blanking by the SLB circuit notwithstanding changes in platform roll angle motion.

APPENDIX

Excel Macro Subroutines

I. Rotate Amplitude Subroutine:
```
Sub RotateCoefficients( )
    Dim r, c, i, j, NumberElements As Integer
    Dim RollAng, cx, cy, cAng, dist, Pi As Double
    Pi = 4 * Atn(1)
    NumberElements = 20
    RollAng = Pi * (Application.InputBox("Roll Angle (deg) :", "Roll Angle Input", 15)) / 180
    cx = 10.5 'center of the matrix
    cy = 10.5
    For r = 1 To NumberElements 'row by row
        For c = 1 To NumberElements 'column by column
            cAng = Atn((r - cy) / (c - cx)) + RollAng      'cell angle plus roll angle
            dist = Sqr((c - cx) ^ 2 + (r - cy) ^ 2)        'cell to center distance
            i = (NumberElements / 2) - Int(dist * Cos(cAng))   'index to the Amp page
            j = (NumberElements / 2) - Int(dist * Sin(cAng))   'don't care about quadrant
            If (i < 1) Then i = 1    'the corners will roll outside of the matrix, keep it inside
            If (j < 1) Then j = 1
            Cells(r, c) = Sheets("Amp").Cells(j, i) 'copy from Amp page to here
        Next c
    Next r
End Sub
II.     Shift Phase Subroutine:
Sub ShiftCoefficients( )
    Dim r, c, i, j, NumberElements As Integer
    Dim RollAng, cAng, dist, Pi As Double
    NumberElements = 20
    RollAng = Application.InputBox("Roll Angle (deg) :", "Roll Angle Input", 15)
    For r = 1 To NumberElements 'row by row
        For c = 1 To NumberElements 'column by column
            cAng = Sheets("Phs").Cells(r, c) + RollAng
            If (cAng >= 360) Then cAng = cAng - 360
            If (cAng < 0) Then cAng = cAng + 360
            Cells(r, c) = cAng
        Next c
    Next r
End Sub
```

What is claimed is:

1. A method for providing electronic motion compensation for a moving platform mounted phased array radar antenna system subject to changes in roll, pitch and yaw, the radar system including a main antenna channel and at least one auxiliary antenna channel respectively for receiving main 2. The method of claim 1 wherein the method further includes the steps of:

(d) applying pitch and yaw angle information derived from the antenna system to the roll motion compensator;

(e) the roll motion compensator generating further sets of phase digital coefficient values modified as a function of received pitch and yaw angle information for providing additional quadrant phase rotation to electronically steer the auxiliary antenna beam toward the horizon for compensating for changes in platform pitch and yaw.

3. The method of claim 2 wherein step (e) further includes generating the further sets of phase digital coefficient values before generating the phase digital coefficient values of step (a).

4. The method of claim 2 wherein step (e) further includes generating the further sets of phase digital coefficient values after generating the phase digital coefficient values of step (a).

5. The method of claim 2 wherein step (e) further includes generating the further sets of phase digital coefficient values according to the following equation:

$$rPHs'(r, c) = rPHs(r, c) + \frac{2\pi}{\lambda}(X(r) \cdot \cos\theta \cdot \sin\varphi + Y(c) \cdot (\sin\theta \cdot \cos\tau - \cos\theta \cdot \cos\varphi \cdot \sin\tau))$$

where rPhs defines the phase angle before or after roll compensation, rPhs' defines the phase angle after roll, pitch and yaw angle compensations, r defines the row number of the antenna element within a matrix representation of antenna elements, c defines the column number of the antenna element, X(r) defines the vertical distance from the center of the array to the elements in row r, Y(c) defines the horizontal distance from the center to the elements in column c, $\lambda$ defines the wave length, $\theta$ defines the pitch angle, $\phi$ defines the yaw angle, and $\tau$ defines the antenna tilt angle.

6. The method of claim 2 wherein each transmit/receive module includes phase shifter, attenuator and module controller circuits, the module controller circuit applying each new set of amplitude and phase digital coefficient values to the phase shifter and attenuator circuits causing both amplitude and phase rotation of the received auxiliary beam sidelobe antenna pattern shaping the pattern in a manner which compensates for the change in platform roll, pitch and yaw angle motion for providing effective sidelobe blanking of interference signals by the SLB circuit.

7. The method of claim 1 wherein in step (a), the new sets of amplitude and phase digital coefficient values are generated off-line in response to different values of roll angle and initially stored in a memory and wherein in step (b), the new sets of amplitude and phase digital coefficient values applied to the auxiliary beam steering generator are obtained from the memory selected through roll angle information derived from the platform motion data signals received during antenna system operation.

8. The method of claim 1 wherein the method further includes the steps of:
(f) including in the radar data processor, a memory operatively coupled to the roll angle motion compensator; and
(g) initially storing in the memory, an initial set of amplitude and phase digital coefficient values generated for a zero roll angle for establishing the characteristics of the received auxiliary antenna sidelobe beam pattern throughout the operation of the radar antenna system.

9. The method of claim 8 wherein the method further includes the step of:
(k) applying the initial set of amplitude and phase digital coefficient values from the memory to the roll angle compensator during radar system operation to be used in generating each new set of amplitude and phase digital coefficients as a function of changes in roll angle.

10. The method of claim 9 wherein the new sets of amplitude and phase digital coefficient values are generated at a rate which is less than a rate at which the radar data processor operates.

11. The method of claim 10 wherein the rate at which each new set of amplitude and phase digital coefficient values are generated corresponds to the rate of change in platform motion which is much slower than the rate at which the radar data processor operates.

12. The method of claim 10 wherein the roll, pitch and yaw angle compensator generates a new set of amplitude and phase digital coefficient values only when the change in any or total of the roll, pitch and yaw angle is indicated to be greater than a pre-established value.

13. The method of claim 1 wherein the radar data processor includes a buffer memory operatively coupled to the roll angle motion compensator, the buffer memory for storing each new set of amplitude and phase digital coefficient values generated by the roll angle motion compensator and the method further including the step of:
(h) applying each new set of amplitude and phase digital coefficient values generated and stored in the buffer memory to the auxiliary beam steering generator during a receive cycle of operation of the moving platform radar antenna system.

14. The method of claim 13 wherein the transmit/receive modules of the auxiliary antenna includes inputs coupled for receiving signals from a plurality of radiating elements of the auxiliary antenna and wherein the buffer memory is organized into row and column elements representing the plurality of radiating elements, the method further comprising the steps of:
(i) including in the roll angle compensator, a rotate amplitude generation subroutine component for generating amplitude rotate coefficient values row by row and column by column as a function of an input roll angle value; and
(j) including in the roll angle compensator, a shift phase generation component for generating phase rotate coefficient values row by row and column by column as a function of the input roll angle value in step (g).

15. The method of claim 14 wherein the radar data processor further includes inputs for receiving current platform motion signals indicating changes in the roll angle of the moving platform mounted radar antenna system and a beam pointing process component for generating the input roll angle values based on received platform motion signals.

16. The method of claim 14 wherein in response to a change in input roll angle, the rotate amplitude generation subroutine component causes a shifting of the initial amplitude values obtained from the memory to adjacent row and column array element locations within the buffer memory in the direction of the roll angle.

17. The method of claim 14 wherein in response to a change in roll angle, the shift phase generation subroutine component changes the initial phase angle value obtained from the memory in each row and column of a quadrant by an amount proportional to the change in input roll angle for storage in the buffer memory.

18. Apparatus for providing electronic angle motion compensation for a moving platform mounted phased array radar antenna system subject to changes in roll, yaw and pitch, the radar antenna system including a main antenna channel and at least one auxiliary antenna channel for receiving main beam, auxiliary beam and side lobe antenna patterns from transmit/receive modules of the main and auxiliary antennas, the main and auxiliary channels being coupled to a sidelobe blanking (SLB) circuit for blanking out interference and whose output couples to a radar data processor included in the system for providing accurate target detection, the apparatus comprising:

(a) a roll angle compensator for generating new sets of amplitude and phase digital coefficient values modified as a function of angle information derived from platform motion data signals provided by the antenna system, each new set providing both quadrant phase rotation and the element amplitude weighting rotation;

(b) the roll motion compensator being coupled to an auxiliary beam steering generator for receiving the new sets of amplitude and phase digital coefficient values; and (c) the auxiliary beam steering generator being coupled to the transmit/receive modules of the auxiliary antenna, the auxiliary beam steering generator being operative during a receive cycle of operation, to apply each new set of amplitude and phase weighting coefficient values to the transmit/receive modules for causing both amplitude and phase rotation of the received auxiliary beam SLB antenna pattern resulting in a pattern broad enough to provide effective sidelobe blanking by the SLB circuit notwithstanding changes in platform angle motion.

19. The apparatus of claim 18 wherein each transmit/receive module of the auxiliary antenna includes phase shifter, attenuator and module controller circuits, the module controller circuit being operative to apply each new set of amplitude and phase digital coefficient values to the phase shifter and attenuator circuits causing both amplitude and phase rotation of the received auxiliary beam sidelobe antenna pattern for shaping the pattern in a manner which compensates for the change in platform roll angle motion for providing effective sidelobe blanking of interference signals by the SLB circuit.

20. The apparatus of claim 18 wherein the radar data processor further includes:

(d) a memory operatively coupled to the roll angle motion compensator; and (e) means for initially storing in the memory, an initial set of amplitude and phase digital coefficient values for a zero roll angle which are used to establish the characteristics of the received auxiliary antenna sidelobe beam pattern throughout the operation of the radar antenna system.

21. The apparatus of claim 18 wherein the radar data processor further includes a buffer memory operatively coupled to the roll angle motion compensator, the buffer memory being operative to store each new set of amplitude and phase digital coefficient values generated by the roll angle motion compensator and the roll angle motion compensator being operatively coupled to the auxiliary beam steering generator for applying each new set of amplitude and phase digital coefficient values generated and stored in the buffer memory during a receive cycle of operation of the moving platform radar antenna system.

22. The apparatus of claim 21 wherein the transmit/receive modules of the auxiliary antenna further includes inputs coupled for receiving signals from a plurality of radiating elements of the auxiliary antenna and wherein the buffer memory is organized into row and column elements representing the plurality of radiating elements, the apparatus further comprising:

(f) a rotate amplitude generation subroutine component for generating amplitude rotate coefficient values row by row and column by column as a function of an input roll angle value; and (g) a shift phase generation component for generating phase rotate coefficient values row by row and column by column as a function of the input roll angle value.

23. The apparatus of claim 22 wherein the radar data processor further includes inputs for receiving current platform motion signals indicating changes in the roll angle of the moving platform mounted radar antenna system and a beams pointing process component for generating the input roll angle values based on received platform motion signals.

24. The apparatus of claim 22 wherein in response to a change in input roll angle, the rotate amplitude generation subroutine component causes a shifting of the initial amplitude values obtained from the memory to adjacent row and column array element locations within the buffer memory in the direction of the roll angle.

25. The apparatus of claim 22 wherein in response to a change in roll angle, the shift phase generation subroutine component changes the initial phase angle value obtained from the memory in each row and column of a quadrant by an amount proportional to the change in input roll angle for storage in the buffer memory.

26. The apparatus of claim 18 wherein the memory of the radar data processor is operative to apply the initial set of amplitude and phase digital coefficient values to the roll angle motion compensator during system operation to be used in generating each new set of amplitude and phase digital coefficients as a function of changes in roll angle.

27. The apparatus of claim 26 wherein the each new set of amplitude and phase digital coefficient values are generated at a rate which is less than a rate at which the radar data processor operates.

28. The apparatus of claim 27 wherein the rate at which each new set of amplitude and phase digital coefficient values are generated corresponds to the rate of change in platform motion which is much slower than the rate at which the radar data processor operates.

29. The apparatus of claim 28 wherein the roll angle compensator generates a new set of amplitude and phase digital coefficient values only when the change in any one or a total roll, pitch and yaw angle is indicated to be greater than a pre-established value.

30. The apparatus of claim 18 wherein the roll angle compensator is included in the radar processor.

31. The apparatus of claim 18 wherein the roll angle compensator is included within the auxiliary beam steering generator.

* * * * *